(12) United States Patent
Atluri et al.

(10) Patent No.: US 8,403,673 B2
(45) Date of Patent: Mar. 26, 2013

(54) MOTION PLATFORM SYSTEM

(75) Inventors: Kishore Dutt Atluri, Andhra Pradesh (IN); Ravikumar Midthala, Andhra Pradesh (IN); Samson Jayaprakash Anga, Andhra Pradesh (IN)

(73) Assignee: Zen Technologies Ltd., Hyderabad (IN)

( * ) Notice: Subject to any disclaimer, the term of this patent is extended or adjusted under 35 U.S.C. 154(b) by 532 days.

(21) Appl. No.: 12/377,757

(22) PCT Filed: Aug. 17, 2007

(86) PCT No.: PCT/IN2007/000349
§ 371 (c)(1),
(2), (4) Date: Jul. 2, 2010

(87) PCT Pub. No.: WO2008/020459
PCT Pub. Date: Feb. 21, 2008

(65) Prior Publication Data
US 2010/0273132 A1   Oct. 28, 2010

(30) Foreign Application Priority Data
Aug. 18, 2006   (IN) .......................... 1463/CHE/2006

(51) Int. Cl.
*G09B 9/08* (2006.01)
(52) U.S. Cl. ........................................................ 434/55
(58) Field of Classification Search .................. 434/29, 434/30, 33, 34, 55, 58, 61, 62
See application file for complete search history.

(56) References Cited

U.S. PATENT DOCUMENTS

| | | | |
|---|---|---|---|
| 3,295,224 A * | 1/1967 | Cappel | 434/58 |
| 4,343,610 A * | 8/1982 | Chou | 434/58 |
| 4,753,596 A | 6/1988 | Hart et al. | |
| 4,806,068 A * | 2/1989 | Kohli et al. | 414/735 |
| 5,071,352 A * | 12/1991 | Denne | 434/29 |
| 5,490,784 A * | 2/1996 | Carmein | 434/55 |
| 5,605,462 A * | 2/1997 | Denne | 434/55 |
| 5,740,699 A | 4/1998 | Ballantyne et al. | |
| 5,853,330 A * | 12/1998 | Engstrand | 472/60 |
| 5,901,936 A * | 5/1999 | Bieg | 248/370 |

(Continued)

FOREIGN PATENT DOCUMENTS
EP   109201   5/1984

OTHER PUBLICATIONS

International Search Report for corresponding PCT Application No. PCT/IN2007/000349, dated Jan. 28, 2008.

*Primary Examiner* — Kurt Fernstrom
(74) *Attorney, Agent, or Firm* — James M Smedley LLC; James M. Smedley, Esq.

(57) ABSTRACT

The present invention relates to a motion platform system comprising of a base (1), a moving platform (2) displaceable by five actuators along and about the three axes in five degrees of freedom, said moving platform (2), connected to said base (1) by at least three links, wherein one of the said links is a column (3) capable of having at least one rotational freedom at the base of the column (3); the other two links include actuators controlling rotational degrees of freedom about the 'X' and 'Y' axes; another actuator controlling rotational degree of freedom about the 'Z' axis; other two actuators controlling translational degrees of freedom along the 'X' and 'Y' axes; said column (3) including a joint (12) at the top of the said column (3), said joint (12) capable of providing at least one rotational degree of freedom about any of the three axes.

11 Claims, 5 Drawing Sheets

U.S. PATENT DOCUMENTS 6,027,342 A    2/2000  Brown
6,077,078 A *  6/2000  Alet et al. ................. 434/55
6,445,960 B1 * 9/2002  Borta ........................ 700/28
7,124,660 B2 * 10/2006 Chiang ................... 74/490.05

* cited by examiner ically, the present invention relates to a motion platform

MOTION PLATFORM SYSTEM

TECHNICAL FIELD

The present invention relates to a motion platform system. Particularly, the present invention relates to a motion platform system for motion simulation by displacing the moving platform in five degrees of freedom.

The basic function of the present invention is to facilitate the simulation of motion encountered by a vehicle during its movement by providing a system for generating relevant translational and rotational motions.

BACKGROUND OF THE INVENTION

A number of motion simulation systems or mechanisms are known with a restricted degrees of freedom. It is also known to produce mechanisms which provide motion in three degrees of freedom, viz. the axes of heave, pitch and roll.

For ease of convenience, pitch refers to the motion in which the moving platform rotates about its X-axis (transverse axis). Roll refers to the motion in which the moving platform rotates about its Y-axis (longitudinal axis). Yaw refers to the motion in which the moving platform rotates about its Z-axis (vertical axis). Surge refers to the translational motion of the moving platform along its Y-axis. Sway refers to the translational motion of the moving platform along its X-axis.

One of the motion simulators has been described in U.S. Pat. No. 3,295,224 (1967; re-issued as Re 27,051 in 1971) which describe a motion simulator consisting of a planar spatial frame connected to a fixed base frame and is defined by at least three stationary points on the grounded base. It is connected to six independent kinematic legs, these six legs are connected to both the base plate and top plate by universal joints in parallel located at both ends of each leg. The legs are designed with an upper body and lower body that can be adjusted, allowing each leg to be varied in length.

FIG. 1 shows the isometric view of the motion simulator described above. To achieve a single degree of freedom in the top frame all the actuators need to be actuated. The loads are directly on the actuator which would result in greater power rating for the actuators. For each individual moment (degrees of freedom) either (pitch, row, yaw, surge and sway), all the actuators need to be moved simultaneously with varying velocities, resulting in non utilization of alternative constant velocity actuators. In order to reduce the degrees of freedom for different applications, all six actuators have to be present.

OBJECT OF THE INVENTION

The present invention obviates the aforesaid drawbacks by providing a motion platform system which enables to control each of the degrees of freedom individually and independently. Further, the present invention enables variable degrees of freedom depending on the requirement.

SUMMARY OF THE INVENTION

The present invention relates to a motion platform system comprising of a base, a moving platform displaceable by at least one actuator at least along or about any of the three axes in at least one degree of freedom, the moving platform connected to the base by at least three links, wherein one of the links is a column capable of having at least one rotational freedom at the base of the column; the column including a joint at the top of the column, said joint capable of providing at least one rotational freedom about any of the three axes.

DETAILED DESCRIPTION OF THE INVENTION

The present invention will now be described with reference to the following figures, wherein the same numerals relate to the same parts and wherein.

A preferred embodiment of the present invention will be described with reference to the aforesaid drawings.

Figure 1:
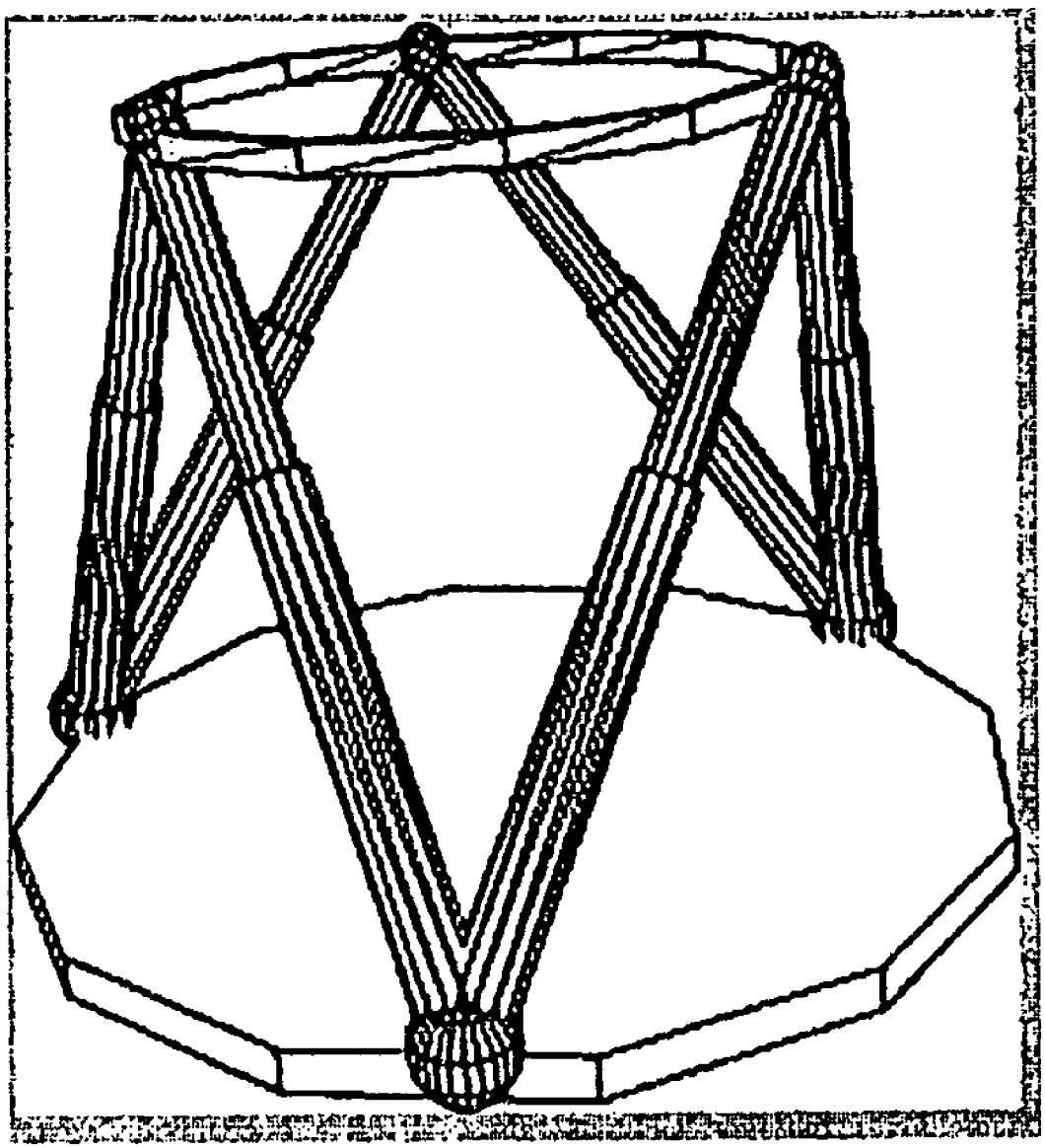
FIG. 1 shows the isometric view of a prior art motion simulator.
Figure 2:
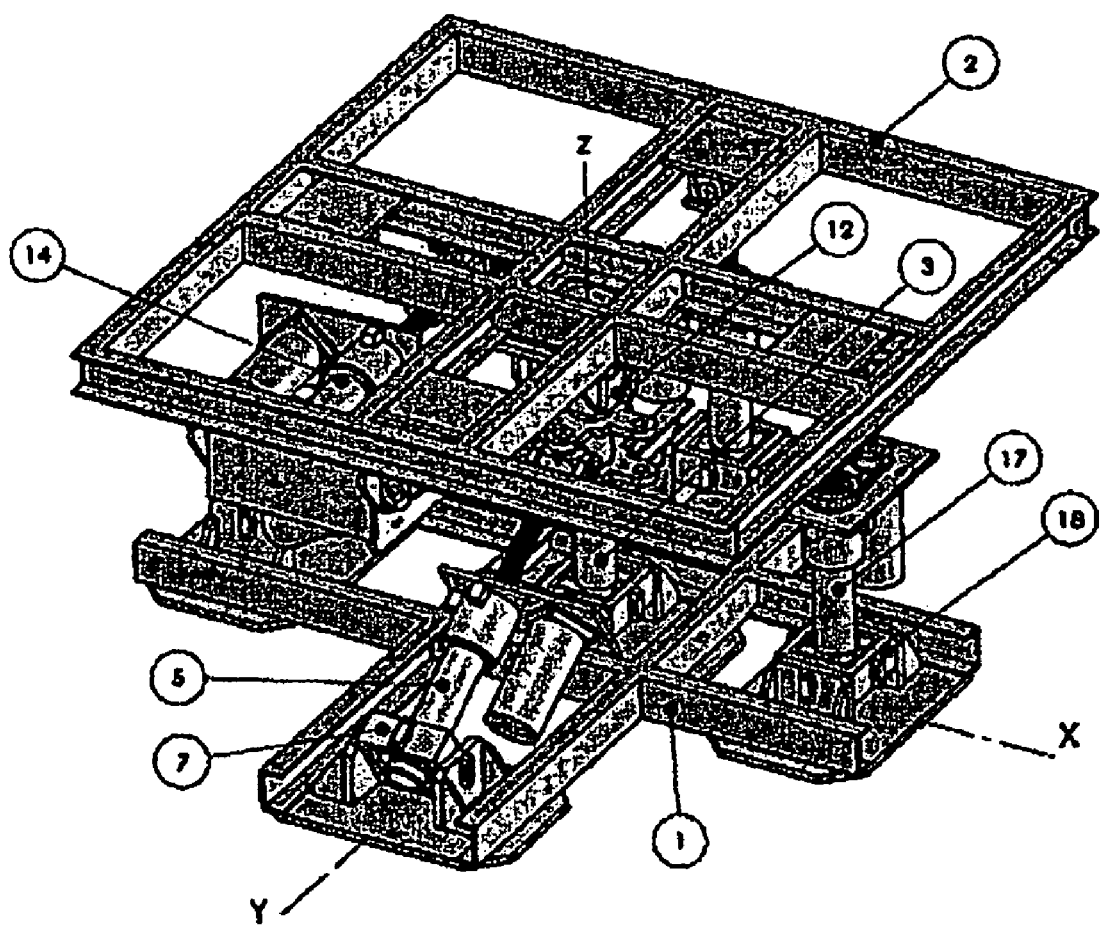
FIG. 2 shows the isometric view of the assembled motion platform system.
Figure 3:
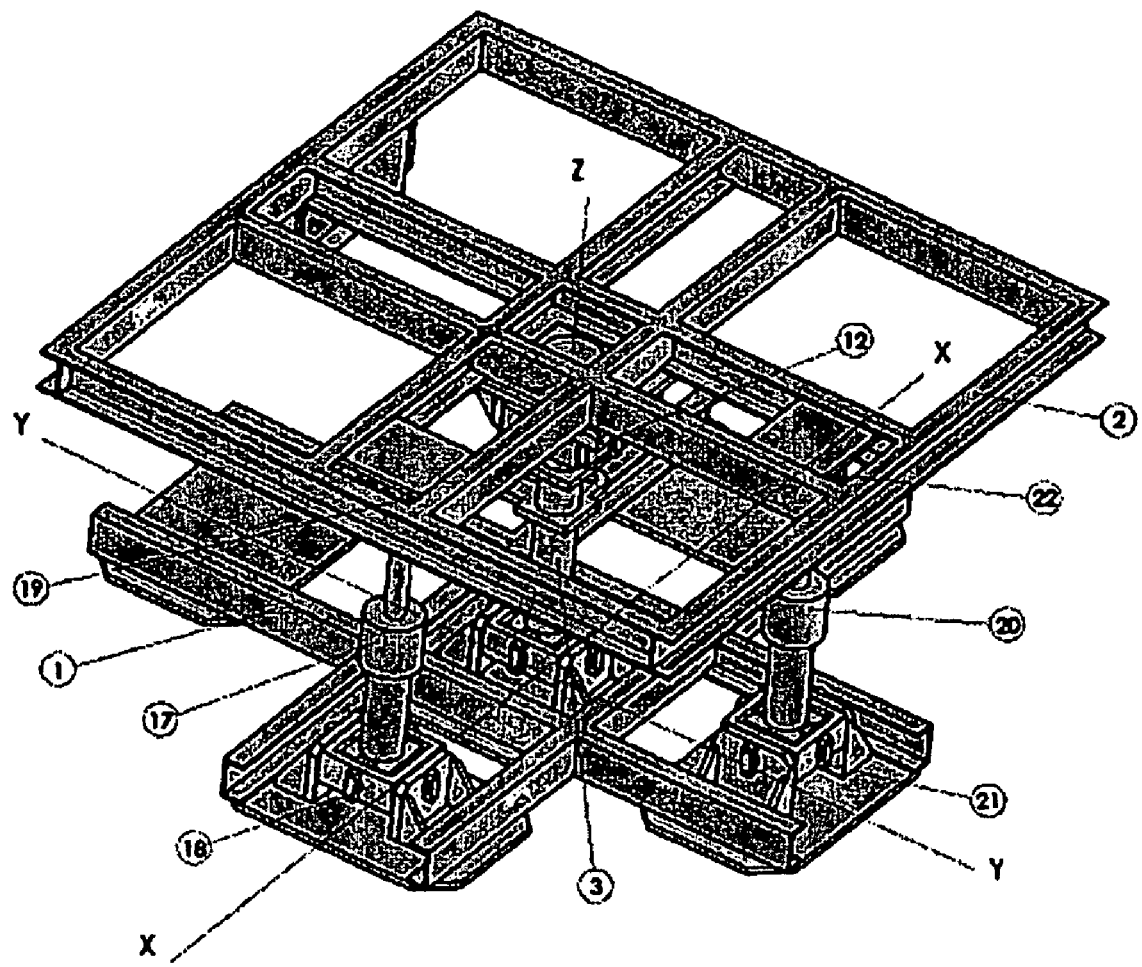
FIG. 3 shows the isometric view of the assembled motion platform system rotated about the Z axis by 90 degrees in clockwise direction showing the links.

Referring to the FIGS. 2 and 3, the present invention relates to a motion platform system comprising of a base (1), a moving platform (2) displaceable by at least one actuator at least along or about any of the three axes in at least one degree of freedom. The moving platform is connected to said base by three links, wherein one of the said links is a column (3) capable of having at least one rotational freedom at the base of the column. The other two links are preferably actuators capable of controlling the rotational freedom about the 'X' axis or 'Y' axis, which are connected between the moving platform and the base (1).

One end of the actuator (17) (roll actuator) is connected to the base (1) at a point along the X-axis or even a shift of +/−30 degrees away from X axis of the base (1) with a joint (18), and the other end is connected to the moving platform (2) at a point along the X-axis or even a shift of +/−30 degrees away from X axis of the moving platform (2) with a joint (19). The length of the actuator controls the rotational freedom of moving platform (2) about the Y-axis of the top joint (12). Similarly, one end of another actuator (20) (pitch actuator) is connected to the base (1) at a point along the Y-axis or even a shift of +/−30 degrees away from y axis of the base (1) with a joint (21) and the other end is connected to the moving platform (2) in a point along the Y-axis or even a shift of +/−30 degrees away from Y axis of the moving platform (2) with a joint (22). The length of the actuator controls the rotational freedom of moving platform (2) about the X-axis of top joint (12).

Figure 4:
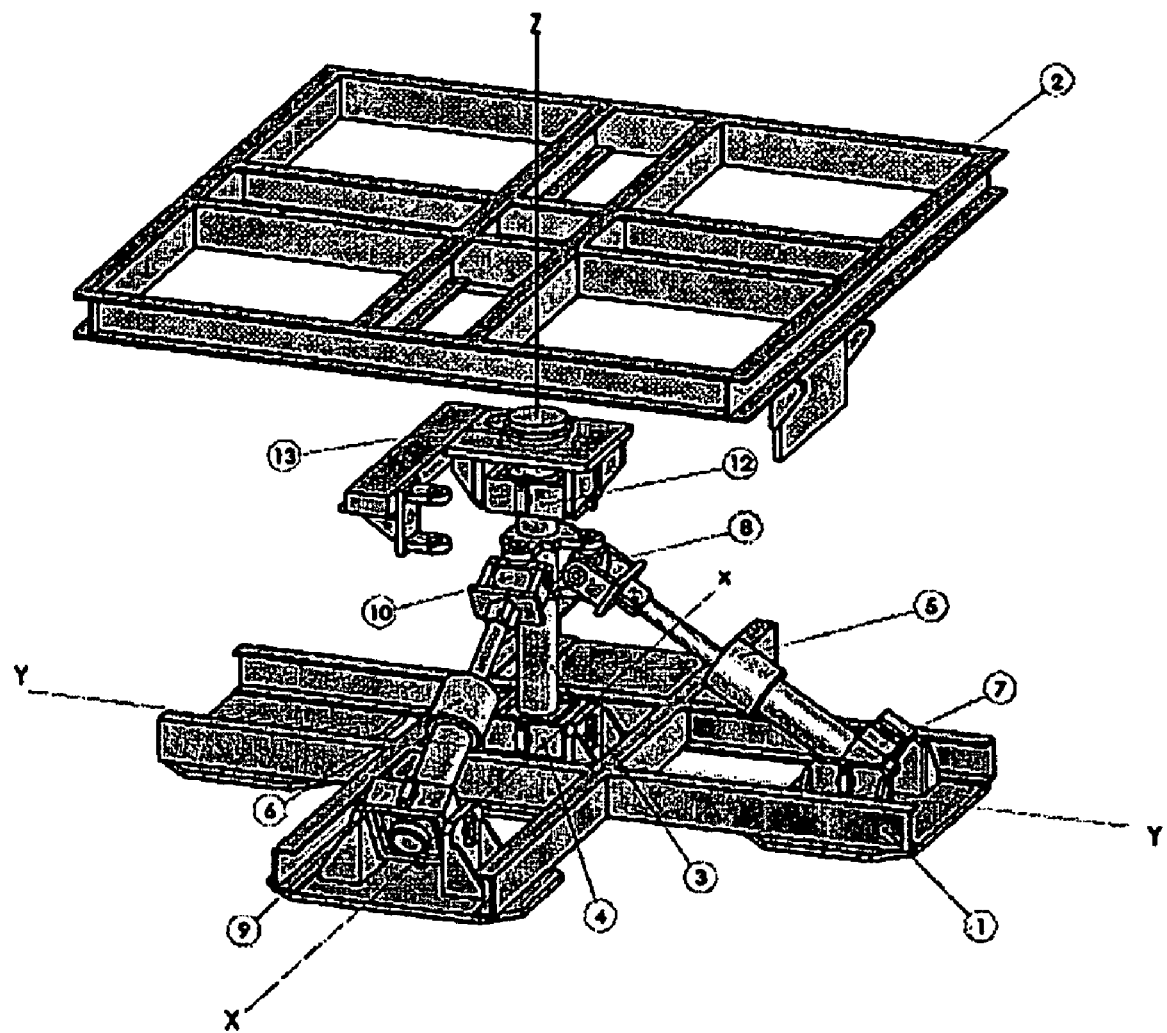
FIG. 4 shows the exploded isometric view of the motion platform system rotated about the Z axis by 90 degrees in counter clockwise direction showing the actuators for translational motions.

FIG. 4 describes the use of additional actuators capable of controlling translational degree of freedom along the 'X' axis or 'Y' axes which are connected between the column (3) and the base (1). The bottom end of the column (3) (the load bearing link of the moving platform) is connected to the base (1) by a joint (4) having two degrees of freedom viz. rotational degrees of freedom about X and Y axes. It is held upright by two actuators (surge actuator (5) and sway actuator (6)). The surge actuator (5) is connected to the base (1) with a joint (7) at its bottom end and is connected to the column (3) with a joint (8). Similarly, the sway actuator (6) is connected to the base (1) with a joint (9) at its bottom end and is connected to the column (3) with a joint (10).

The yoke of the top joint (12) is the base of the moving platform (2). The coordinate positions of the centre of the yoke in space (attained by the rotational degree of freedom of the column (3) at its base) are controlled by the lengths of the surge actuator (5) and sway actuator (6). Translational position along X-axis is controlled by the sway actuator (6) and the translational position along Y-axis is controlled by the surge actuator (5). The yoke has two degrees of freedom at its top joint (12) i.e. rotational degrees of freedom about X and Y axes in space which are parallel to corresponding X and Y axes of the base frame (1).

Figure 5:
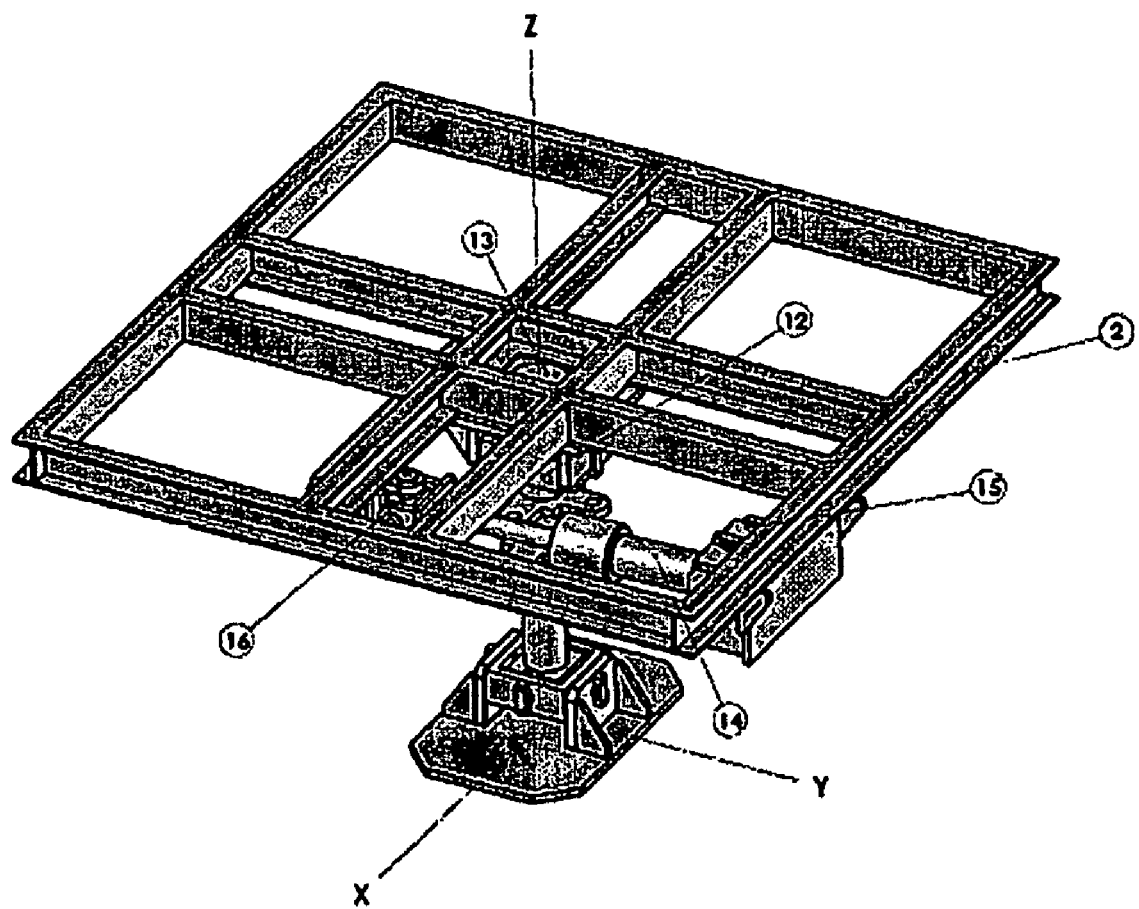
FIG. 5 shows the isometric view of the column, actuator and the moving platform rotated about the Z axis by 90 degrees in counter clockwise direction.

Referring to FIG. 5, an actuator (yaw actuator (14)) capable of controlling rotational degree of freedom about the 'Z' axis is connected between the moving platform (2) and the joint (12) at the top of the column (3). The moving platform (2) when coupled to yoke of top joint (12) has one planar rotational degree of freedom about its Z-axis (yaw) at the origin of the spatial plane frame (moving platform (2)) relative to the yoke. It rotates about a pin joint (13) and the freedom is controlled by the length of the yaw actuator (14) between a point on the yoke (centre of the joint (16)) and the point on the moving platform (2) (centre of the joint (15)). It gets two rotational degrees of freedom relative to the column (3) i.e. two rotational freedoms in space namely pitch and roll and another two degrees of translational freedom along the X & Y axes, namely surge and sway, in space which are getting controlled by the surge actuator (5) and the sway actuator (6).

Preferably, the motion platform system is designed to facilitate five different degrees of freedom viz. motions to its moving platform namely pitch, roll, yaw, surge and sway on which to payload (for example vehicle cabin) is mounted.

The motion platform system for achieving five different degrees of freedom comprises of a base, a moving platform displaceable by five actuators along and about the three axes in five degrees of freedom. The moving platform is connected to said base by three links, wherein one of the links is a column capable of having at least one rotational degree of freedom at the base of the column. The other two links include actuators controlling the rotational freedom about the 'X' and 'Y' axes. Another actuator is included in the system which controls the rotational freedom about the 'Z' axis. The other two actuators controlling translational freedom along the 'X' and 'Y' axes are also incorporated.

All the above motions are implemented by using linear actuators (which act as links in the mechanism) and joints. Linear actuator is a cylindrical pair having controlled linear freedom and independent rotational freedom to its moving element. Unless activated by power, there is no linear movement.

The size of the motion platform can be changed as per the requirement depending upon the type of vehicle cabin, keeping the actuators' axes relatively constant.

The base is a stationary platform which acts as a base link for the mechanism. The column is a load bearing link which is connected at the centre of the moving platform at one end and at the other end is connected to the base. Moving platform is a spatial plane frame on which the vehicle cabin is mounted and to which five degrees of freedom is provided.

The composite motion to the moving platform is provided by changing the lengths of actuators. The motion platform described above has many applications like a motion simulator, a manipulator etc.

One example of the use of the motion platform system is in a vehicle simulator. The specifications of 5 degrees of freedom motion simulation platform using electrical actuators for a payload of 1000 Kg having the center of gravity at $\leqq 600$ mm above from the moving platform.

Pitch:
Displacement=±14 Deg
Velocity=16 Deg/Sec
Acceleration=405 Deg/Sec$^2$
Roll:
Displacement=±14 Deg
Velocity=16 Deg/Sec
Acceleration=405 Deg/Sec$^2$
Yaw:
Displacement=±15 Deg
Velocity=26 Deg/Sec
Acceleration=550 Deg/Sec$^2$
Surge:
Displacement=±120 mm
Velocity=238 mm/Sec
Acceleration=6024 mm/Sec$^2$
Sway:
Displacement=±120 mm
Velocity=238 mm/Sec
Acceleration=6024 mm/Sec$^2$ To achieve the motion requirements, the motion platform has the following specifications:

Actuators:
a) Motor Power=2.2 KW each.
b) Max. Stroke length=±140 mm
Motion Platform:
Base frame Size=1800×1800 mm
Moving Top platform Size=1600×1600 mm
Total Height of the platform=950 mm The above mentioned is an example and variations can be done by altering the appropriate governing parameters.

The motion platform according to the present invention has certain advantages, which are listed below:

1. The payload (load of the equipment being simulated) is transferred to the base frame through the central column which is close to the centre of gravity (C.G.) of the payload.
2. The platform is so designed to provide motions with least effort as the payload is not directly on power driven actuators.
3. To cause movement in any degree of freedom only one input parameter, i.e., the change in length of actuator, is sufficient.
4. It can provide simultaneous and maximum displacements in all five degrees of freedom.
5. Any actuator such as electrical, hydraulic, pneumatic, etc., can be used.
6. Joints are designed to provide requisite freedom within a limited space. This results in minimal joint profiles.
7. Constant speed linear actuators can be used.

The invention claimed is:

1. A motion platform system comprising
a base; and
a moving platform displaceable by at least one actuator at least along or about any of three axes in at least one degree of freedom, the three axes being an 'X' axis, a 'Y' axis and a 'Z' axis, said moving platform being connected to said base by three links, wherein one of said three links is a column capable of having at least one rotational degree of freedom at the base of said column; said column including a joint at the top of said column, and wherein said joint is capable of providing at least one rotational degree of freedom about any of the three axes.

2. The motion platform system as claimed in claim 1, wherein other links from said three links include actuators.

3. The motion platform system as claimed in claim 2, wherein another actuator capable of controlling a rotational freedom about the 'Z' axis is connected between said moving platform and said joint at the top of said column.

4. The motion platform system as claimed in claim 2, wherein the actuators capable of controlling rotational freedom about the 'X' axis or the 'Y' axis are connected between said moving platform and said base.

5. The motion platform system as claimed in claim 4, wherein said actuators are placed at an angle of +/−30 degrees from the respective 'Y' axis or 'X' axis.

6. The motion platform system as claimed in claim 4, wherein said actuator is placed along the respective 'Y' axis or 'X' axis.

7. The motion platform system as claimed in claim 2, wherein additional actuators capable of controlling translational freedom along the 'X' axis or the 'Y' axis are connected between said column and said base.

8. The motion platform system as claimed in claim 7, wherein the ends of said actuators on the base is at an angle of +/−30 degrees from the respective 'X' axis or 'Y' axis.

9. The motion platform system as claimed in claim 7, wherein the ends of said actuators on the base is on the respective 'X' axis or 'Y' axis.

10. A motion platform system comprising
a base; and
a moving platform displaceable by five actuators along and about three axes in five degrees of freedom, the three axes being an 'X' axis, a 'Y' axis and a 'Z' axis, said moving platform being connected to said base by three links, wherein one of said three links is a column capable of having at least one rotational degree of freedom at the base of the column; the other two links include actuators controlling rotational degrees of freedom about the 'X' axis and the 'Y' axis; another actuator controlling rotational degree of freedom about the 'Z' axis; other two actuators controlling translational degrees of freedom about the 'X' and 'Y' axes; said column including a joint at the top of said column, and wherein said joint is capable of providing at least one rotational degree of freedom about any of the three axes.

11. The motion platform it system as claimed in claim 1 used for motion simulation.

* * * * *